Figure 1:
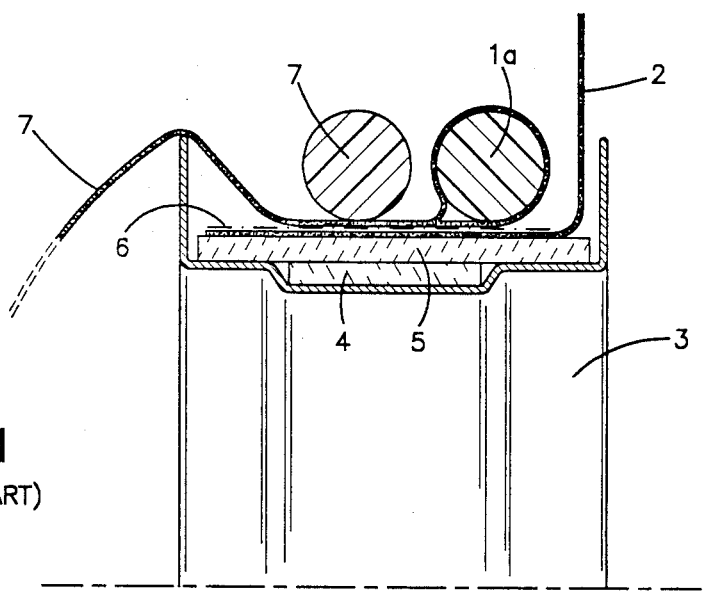

United States Patent [19]

Lepissier

[11] Patent Number: 4,984,828
[45] Date of Patent: Jan. 15, 1991

[54] DEVICE FOR SEALING THE END OF A FLEXIBLE COLLAR TO A FLEXIBLE TUBULAR WALL

[75] Inventor: Jean-Jacques Lepissier, Vendome, France

[73] Assignee: S.N.E.LA Calhene, Velizy, France

[21] Appl. No.: 452,678

[22] Filed: Dec. 18, 1989

[30] Foreign Application Priority Data

Dec. 19, 1988 [FR] France .................. 88 16735

[51] Int. Cl.⁵ .............................................. F16L 39/04
[52] U.S. Cl. ....................................... 285/200; 312/1; 285/344
[58] Field of Search ................... 285/344, 260, 200; 321/1 X

[56] References Cited

U.S. PATENT DOCUMENTS

| | | | |
|---|---|---|---|
| 1,502,673 | 7/1924 | Hole | 285/344 |
| 2,842,773 | 7/1958 | Trexler | 285/260 |
| 3,009,164 | 11/1961 | Frey | 312/1 |
| 3,099,015 | 7/1963 | Renehan | 285/260 |
| 3,140,495 | 7/1964 | Gottwik | 312/1 |
| 3,323,846 | 6/1967 | Boddy | 312/1 |
| 4,141,609 | 2/1979 | Eisert | 312/1 |
| 4,335,712 | 7/1982 | Trexler | 312/1 |

FOREIGN PATENT DOCUMENTS

| | | | |
|---|---|---|---|
| 895998 | 11/1953 | Fed. Rep. of Germany | 285/344 |
| 245460 | 4/1977 | Fed. Rep. of Germany | 285/344 |
| 2725492 | 12/1977 | Fed. Rep. of Germany | 312/1 |
| 2195510 | 3/1974 | France . | |
| 2530813 | 1/1984 | France | 312/1 |
| 2598768 | 5/1986 | France . | |

*Primary Examiner*—Eric K. Nicholson
*Attorney, Agent, or Firm*—Pearne, Gordon, McCoy & Granger

[57] ABSTRACT

To connect the end of a flexible collar (11) on a flexible wall (12) that belongs, for example, to a containment insulator, one part of that wall is mounted around a circular opening provided for that purpose on a fixed inner ring (18). A toric joint (20), which rolls between two grooves, (18c, 18b) formed on the ring (18) when the rigid outer ring is put into place (22) covering the end of the collar (11), blocks the wall (12) in the groove (18b). An immobilizing ring (24) is then placed in the other groove (18c) to keep the outer ring (22) from escaping.

5 Claims, 1 Drawing Sheet

U.S. Patent

Jan. 15, 1991

4,984,828

DEVICE FOR SEALING THE END OF A FLEXIBLE COLLAR TO A FLEXIBLE TUBULAR WALL

The invention concerns a device that makes it possible to seal the end of a flexible collar to a flexible tubular wall.

The main purpose of such a device is to connect a collar to the flexible wall of an insulator designed to contain a certain volume of air isolated from the air outside. It can also be used for other applications, notably to seal a glove to a collar which then makes up the flexible tubular wall. More generally, the sealing device in the invention can be used particularly in the medical, biological, pharmaceutical and electronic fields, any time that two flexible tubular bodies made of plastic material or latex, for example, must be sealed and disassembled.

FIG. 1, which is attached, shows schematically a sealing device that is usually used to connect the end of a flexible collar 1 to the flexible wall 2 of a containment insulator.

This known device includes a wheel rim 3, made of painted steel, whose shape is approximately the same as that of a bicycle wheel rim. Two elastic bands made of latex 4 and 5 are placed on the rim 3 in order to define around it a cylindrical surface whose perimeter is roughly rectangular. The flexible wall 2 of the insulator, which has a circular hole of appropriate diameter drilled in it at this point, is twisted around the hole into a tubular shape and is engaged with force on the outside surface of the band 5. A reinforced adhesive band 6 is then placed on this tubular part of the wall 2 to ensure its mechanical stability.

In order to ensure the connection, a toric flange 1a formed on the end of the flexible collar 1 is engaged on the rim and placed around the tubular part of the wall 2 covered by the adhesive band 6. Finally, a toric immobilization joint 7 is forced onto the part of the collar 1 adjacent to the flange 1a and mounted on the rim 3.

This connection device, currently in use, however, has many disadvantages. In the first place, putting the adhesive band 6 in place presents serious problems and most often leads to a system that is not tight. Moreover, the device overall has weak mechanical resistance. Lastly, the shape of the rim 3 leads to a radial extension of part of the collar 1, which is in contact with one side of the rim, which is not very thick. The risk of the collar being torn in this area is thus very great.

The precise goal of the invention is a connection device which while being interchangeable with the regular device just described achieves a perfect seal and significant mechanical stability with less mechanical stress on the collar.

According to the invention, this result is obtained by means of a sealing device on the end of a flexible collar on a flexible tubular wall characterized by the fact that it includes:

- a rigid inner ring which has two adjacent grooves on its outer surface and a shoulder in proximity to the first of said grooves, with the flexible tubular wall mounted on said first groove against said shoulder;
- a tight toric joint that can roll between said grooves to block the flexible tubular wall in said first groove; and
- a rigid outer ring tightly supporting the end of said collar with an inner surface that varies in diameter during the nesting of this outer ring on the inner ring, a joint that rolls between the second and the first groove, and an outer ring that is immobilized against said shoulder.

One advantage is that a toric immobilization joint is provided which is mounted in the second groove, after the outer ring is nested, to prevent it from accidentally escaping.

As in the existing device, the end of the collar includes a flange mounted on an outer surface of the outer ring, and a second immobilization joint is placed on the collar between this flange and a part projecting over the outer surface of the outer ring.

In a preferred version of the invention, the inner surface of the rigid outer ring includes, successively—starting at the end turned toward the part projecting from the rigid inner ring—a bevelled part, a truncated part whose diameter increases starting at the bevelled part, and a cylindrical part.

Figure 2:
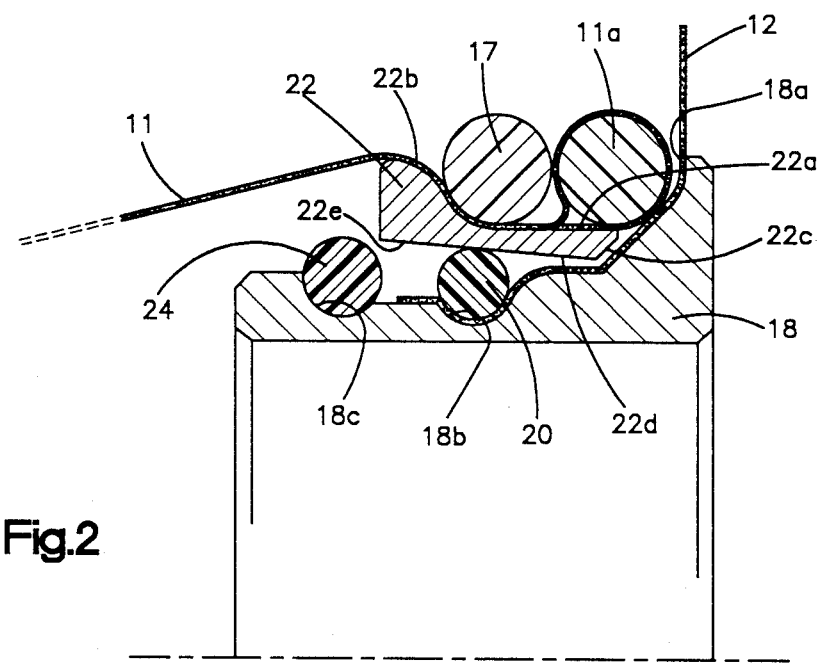

A preferred version of the invention will now be described, as a nonlimiting example, referring to the attached drawings, in which:

FIG. 1, already described, is a cross section illustrating schematically a sealing device according to the present state of the art; and FIG. 2 is a view comparable to FIG. 1 illustrating a sealing device in accordance with the invention.

In FIG. 2, the references 11 and 12 designate respectively the end of a flexible collar and the part of the flexible wall of a containment insulator surrounding a circular opening designed to seal the collar 11.

The sealing device can be dismantled in accordance with the invention and includes a rigid inner ring 18 whose outer surface has—going from right to left in FIG. 2—a projecting end part that forms a shoulder 18a, an initial sectional circular groove 18b and a second sectional circular groove 18c.

The shoulder 18a has successively—looking at the groove 18b—a part that is approximately radial and a truncated part. The latter is connected to the groove 18b by a cylindrical part. The grooves 18b and 18c are separated by a cylindrical part whose diameter is only slightly greater than the diameter of the ring 18 at the bottom of the grooves 18b and 18c, this latter diameter being the same for both grooves. Lastly, the part of the ring 18 located between the groove 18c and the left end of the ring seen in FIG. 2 is cylindrical, and its diameter, which is approximately equal to that of the cylindrical part located to the right of the groove 18b looking at FIG. 2, is greater than that of the cylindrical part included between the two grooves.

The size of the ring 18 is a function of the diameter of the circular opening in the wall 12, so that the part of the wall surrounding the opening is pushed against the part of the outer surface of the ring 18 which covers—starting at the opening in the wall 12—the groove 18b, the shoulder 18a, and the cylindrical part separating the latter.

The sealing device in the invention also includes a toric sealing joint 20 which is initially placed in the groove 18c, which can be rolled up to the groove 18b when force is applied parallel to the axis of the ring 18 on this joint.

The sealing device illustrated in FIG. 2 also includes a rigid outer ring 22 supporting the end of the collar 11.

More precisely, the outer surface of the ring 22—going from right to left in FIG. 2—has a cylindrical part 22a that is relatively small in diameter, followed by a part that projects 22b, a curvilinear section whose diameter increases gradually so as not to form any discontinuity from the cylindrical part up to the left end of the ring 22 looking at FIG. 2. The end of the collar 22, which ends in the usual way with a flange 11a, is forced onto the outer surface of the ring 22 and an elastic immobilization joint 17, toric in shape, is placed around the part of the collar 11 mounted on the ring 22, between the end flange 11a and the part that projects 22b from the outer surface of the ring.

Taking into account the shape of the outer surface of the ring 22, it should be noted that the immobilization joint forces the flange 11a to put pressure on the flexible wall 12, to push the latter against the shoulder 18a of the inner ring 18. The propagation of contamination is thus prevented.

Moreover, the inner surface of the ring 22 has a special shape designed to make the joint 20 roll between the grooves 18b and 18c of the ring 18. When the ring 22 is moved axially on the other ring 18 and to immobilize the ring 22 when it is in the sealing position on the ring 18 illustrated in FIG. 2 [sic].

More precisely, the inner surface of the ring 22—starting from the left looking at FIG. 2—has a bevelled part 22c, a truncated part 22d whose diameter increases slowly starting from the bevelled part 22c, and a cylindrical part 22e.

The diameter of these parts 22d and 22e of the inner surface of the ring 22 are smaller than the outer diameters of the joint 20, when the ring 22 covering the end of the collar 11 is placed on the ring 18, the joint 20 automatically rolls from the groove 18c into the groove 18b. When the joint 20 is in the groove 18b, the flange 11a placed at the end of the collar 11 acts as a support against the right part, which is larger in diameter, formed by the ring 18, as illustrated in FIG. 2. The collar 11 is then sealed to the wall 12.

To avoid any accidental dismantling of the ring 22, an elastic immobilization joint 24, toric in shape with a diameter slightly greater than that of the joint 20 is preferably placed in the groove 18c.

As the preceding description shows, the use of the sealing device in the invention necessitates no change in the existing installation. And it enables a perfect seal and good mechanical stability to be achieved.

The round shape of the outer surface of the ring 22 on which the end of the collar 11 is mounted is also designed to prevent any risk of the collar tearing.

I claim:

1. A sealing device on the end of a flexible collar on a flexible tubular wall which includes:

a rigid inner ring that has a first and second adjacent grooves on an outer surface and a shoulder adjacent the first of said grooves, with flexible tubular wall mounted on said first groove and against the shoulder;

a toric seal that can roll from one groove to another to lock the flexible tubular wall in said first groove; and a rigid outer ring tightly supporting an end of said collar with an inner surface varying in diameter which ensures that during nesting of the outer ring onto the inner ring the toric seal between the second and first grooves rolls and the outer ring abuts against said shoulder.

2. A device according to claim 1, which also includes an immobilized joint that is mounted in said second groove after nesting of the outer ring.

3. A device according to claim 1, in which the end of the collar includes a flange mounted on an outer surface of the outer ring, with an immobilization joint placed on the collar between said flange and a part projecting from said outer surface of the outer ring.

4. A device according to claim 3, in which the part protruding from the outer surface of the outer ring has a rounded shape to prevent collar tearing.

5. A device according to claim 1, in which the inner surface of the rigid outer ring includes a bevelled part, a truncated part whose diameter increases starting from said bevelled part, and a cylindrical part.

* * * * *